Figure 1:
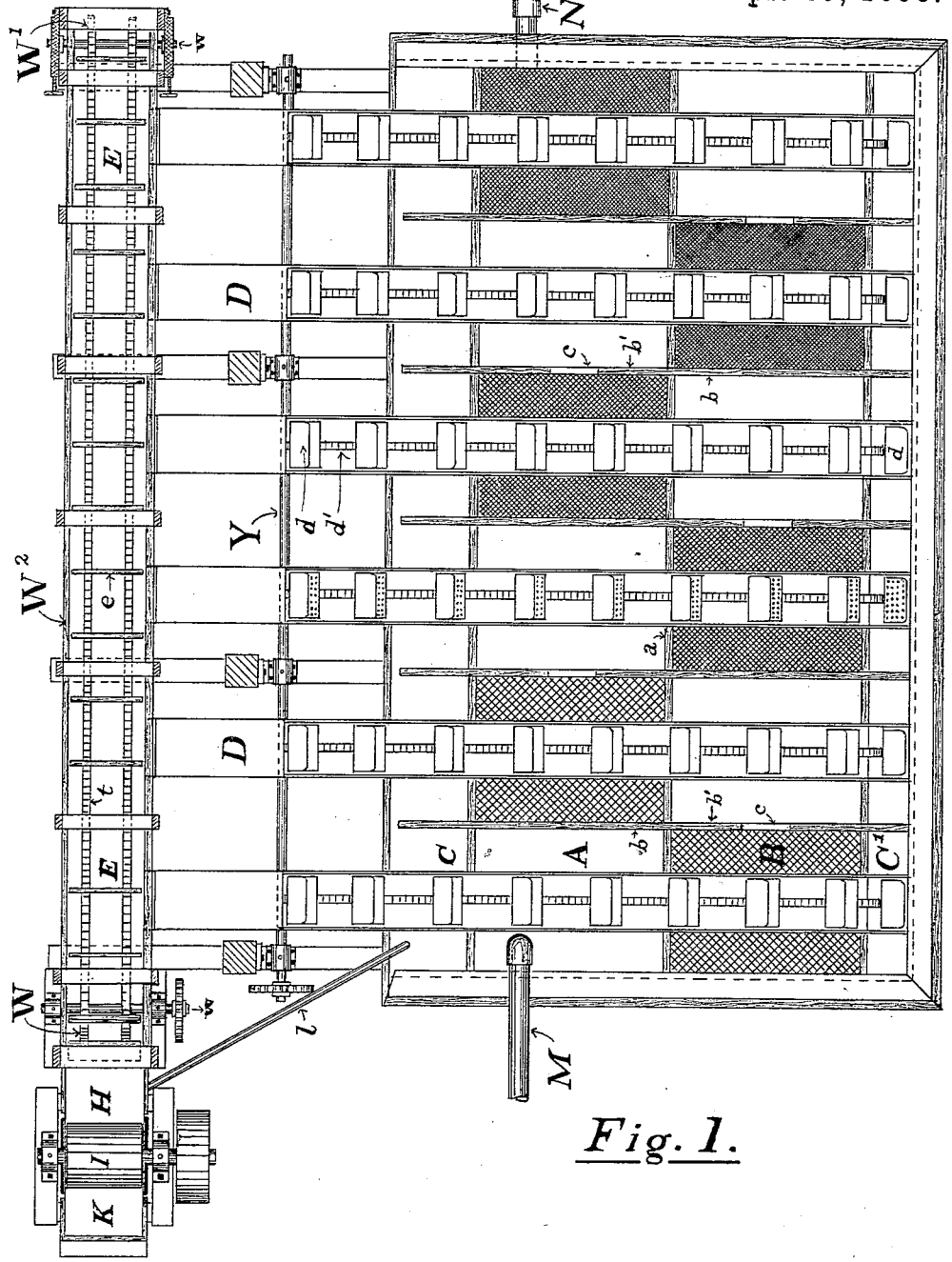

(No Model.) 5 Sheets—Sheet 1.

A. F. McCLATCHEY & C. L. KRUM.
SEPARATING APPARATUS.

No. 602,515. Patented Apr. 19, 1898.

Witnesses,
Reta M. Wagner.
A. Miller Belfield.

Inventors,
Augustus F. McClatchey
Charles L. Krum
by Page & Belfield
Attys (No Model.)　　　　　　　　　　　　　　　　　5 Sheets—Sheet 2.
A. F. McCLATCHEY & C. L. KRUM.
SEPARATING APPARATUS.

No. 602,515.　　　　　　　　　Patented Apr. 19, 1898.

Witnesses,
Reta M. Wagner.
A. Miller Belfield.

Inventors,
Augustus F. McClatchey
Charles L. Krum
by Page & Belfield
attys (No Model.)

5 Sheets—Sheet 3.

A. F. McCLATCHEY & C. L. KRUM.
SEPARATING APPARATUS.

No. 602,515.

Patented Apr. 19, 1898.

Witnesses,
Rela M. Wagner.
A. Miller Belfield

Inventors,
Augustus F. McClatchey
Charles L. Krum,
By Page & Belfield,
Attys.

(No Model.) 5 Sheets—Sheet 4.

A. F. McCLATCHEY & C. L. KRUM.
SEPARATING APPARATUS.

No. 602,515. Patented Apr. 19, 1898.

Witnesses,
Reta M. Wagner.
A. Miller Belfield

Inventors,
Augustus F. McClatchey
Charles L. Krum,
by Page & Belfield,
Attys.

(No Model.) 5 Sheets—Sheet 5.

A. F. McCLATCHEY & C. L. KRUM.
SEPARATING APPARATUS.

No. 602,515. Patented Apr. 19, 1898.

UNITED STATES PATENT OFFICE.

AUGUSTUS F. McCLATCHEY, OF AURORA, AND CHARLES L. KRUM, OF CHICAGO, ILLINOIS.

SEPARATING APPARATUS.

SPECIFICATION forming part of Letters Patent No. 602,515, dated April 19, 1898.

Application filed September 8, 1896. Serial No. 605,156. (No model.)

*To all whom it may concern:*

Be it known that we, AUGUSTUS F. MC-CLATCHEY, of Aurora, in the county of Kane, and CHARLES L. KRUM, of Chicago, in the county of Cook, State of Illinois, citizens of the United States, have invented a certain new and useful Improvement in Separating Apparatus, of which the following is a specification.

Our invention relates to an apparatus for and process of separating out solid or consistent material held in suspension by liquids and recovering such material and the liquid itself after separation. By "solid" or "consistent" material is meant any substance which is not a liquid, but which is characterized by cohesiveness of structure irrespective of its degree of hardness or firmness. For convenience in the discussion of this subject we shall apply the term "mixture" to such substances as are composed of a liquid or liquids containing solid or consistent matter in suspension. From some mixtures it is desirable to recover the solid matter particularly, from others the liquid itself, while in still others the separate possession of both the solid matter and the liquid proper is sought. Belonging to that class of mixtures in which the solid matter is the desired ingredient are "distillers' slops" and the like, it being a well-known fact that the residue resulting from the manufacture of spirits, beer, vinegar, starch, sugar, and the like contains material which is of great commercial value if it can be properly and economically recovered. This "slop" or residue consists in most instances of water having particles of spent grain, gluten, fiber, or the like in suspension. Some of these particles will settle of their own weight in the mixture if the latter is allowed to stand; but the lighter and more flocculent particles must be recovered by straining.

Prior to our invention a number of methods have been employed for the recovery of the solid matter, or "solid product," as it may be termed, from such residue. In one of these the residue has been allowed to run into tanks or vats and to stand in the same for a stated period of time. During this interval of time some of the solid matter settles to the bottom of the tanks or vats, leaving the liquid much clearer than before, but with a small portion of the solid matter still in suspension. This liquid has then been drawn from the tanks, and the solid matter remaining has been removed from the same by hand or otherwise. In another method the slops or residue has been allowed to run into vats provided with strainers, such as cloth or the like, and its solid product has been engaged and held by such strainers and removed in them. Subsequently in both methods the solid product has been placed in bags or between cloths and then carried to the presses, where as much moisture as possible has been squeezed out. The final step has consisted in drying this solid product after it has been removed from the presses. It is admitted that these methods are open to serious objections. In the first one all of the solid product does not settle to the bottom of the tanks or vats, and this, as well as a portion of that which has settled, is carried off by the liquid when the latter flows from the tanks or vats. In the second one the strainers soon become clogged and restrict the flow of the mixture. Consequently in the former a certain portion of the product is completely lost, in the latter considerable inconvenience is experienced in the use of strainers, and in both the process is extremely slow and complicated by reason of the necessity of charging and emptying the tanks, filling and unloading the presses, and cleaning and replacing the strainers. The expense is large, owing to the amount of labor required and the considerable number of cloths destroyed in the presses, and the slowness of the process permits deterioration of the ingredients of the mixture through fermentation and other chemical actions.

Prominent objects of our invention are the provision of a simple, inexpensive, and efficient apparatus for separating solid or consistent materials from the liquids in which they are held in suspension; the arrangement of the same in a manner to permit the separate recovery of the solid or consistent materials and the liquid proper and the provision of means for effecting such recovery; the adaptation of such arrangement and means for the treatment of distillers' slops and the like; the arrangement, in connection with such particular adaptation, of suitable pressing means to form a simple, economical, and convenient apparatus whereby the continuous and uninterrupted separation, recovery, and pressing of the solid or consistent material contained in such slops and the removal of the liquid proper are mechanically effected; the expulsion of as much moisture as possible from such material before the presses are reached, and the eradication of all the objectionable features previously mentioned as being heretofore encountered in the treatment of these slops and the like.

To the attainment of the foregoing and other desired ends our invention contemplates the provision of a vessel or vessels into, through, and from which the mixture may flow and the arrangement within such vessel or vessels of a number of strainers which are adapted to intercept the solid or consistent material and a number of partitions or other suitable repositories upon which such material may settle. The flow of the mixture is directed upward through the strainers, and below each strainer is situated one of these settling partitions or repositories. By such arrangement the solid or consistent materials are deposited upon the settling partitions or repositories, a portion settling of their own weight and the balance being intercepted and deflected downward by the strainers and finally falling to the partitions or repositories below. The straining power of the successive strainers is desirably graduated—that is to say, each strainer is capable of intercepting finer or smaller particles than the preceding one when taken in the order in which the mixture passes through them. In such case the particles are intercepted in the order of their size, the larger ones first and the smaller ones later. The number of settling partitions or repositories need not be limited to the number of strainers; but additional partitions or repositories may be supported in suitable positions within the vessel and arranged to receive any solid matter which may be deposited upon them from the overlying mixture.

Our invention further contemplates the provision of conveying mechanism for collecting the sediment deposited upon the settling-partitions and removing the same from the containing vessel while the straining and settling process is proceeding uninterrupted.

As a further and specific improvement for the adaptation of the apparatus to the treatment of distillers' slops and the like suitable pressing means are provided in connection with the vessel supplied for receiving the mixture, and the conveying mechanism is arranged to carry the sediment collected in the vessel to such pressing means and deliver it there.

As a preferred arrangement the containing vessel comprises a number of vats, tanks, or compartments arranged in a substantially horizontal plane and connected to permit the flow of the mixture through the entire series. The flow of the mixture is directed upward in certain of the tanks or vats and consequently downward in others. The vats or tanks in which the flow of the mixture is directed upwardly are provided with strainers, while the others are preferably constructed to permit the unrestricted flow of the mixture through them. Obviously the bottoms of the vats or tanks form the settling partitions or repositories hereinbefore mentioned and receive deposits of solid or consistent material from the mixture flowing through such vats or tanks, it being observed that in such arrangement the bottoms of the vats or tanks containing strainers constitute partitions below the strainers, while the bottoms of the other vats or tanks may be considered as additional partitions. A portion of the deposit in the vats or tanks containing strainers is caused by such strainers, and hence these vats are termed "straining-vats." The deposit in the other vats or tanks is due merely to the settling of the particles themselves, and these vats therefore are called "settling-vats." In such arrangement the conveying mechanism desirably consists of one or more traveling conveyers arranged to move across the bottoms of the vats or tanks, to collect the sediment deposited there, to lift the same from the tanks or vats, and to deliver it at any desired point. In the particular adaptation for the treatment of distillers' slops and the like the traveling conveyer or conveyers are suitably arranged to carry the sediment to the pressing means and deliver it there.

Figure 5:
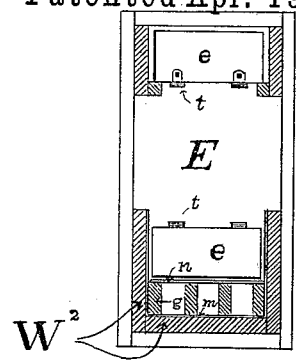
Figure 2:
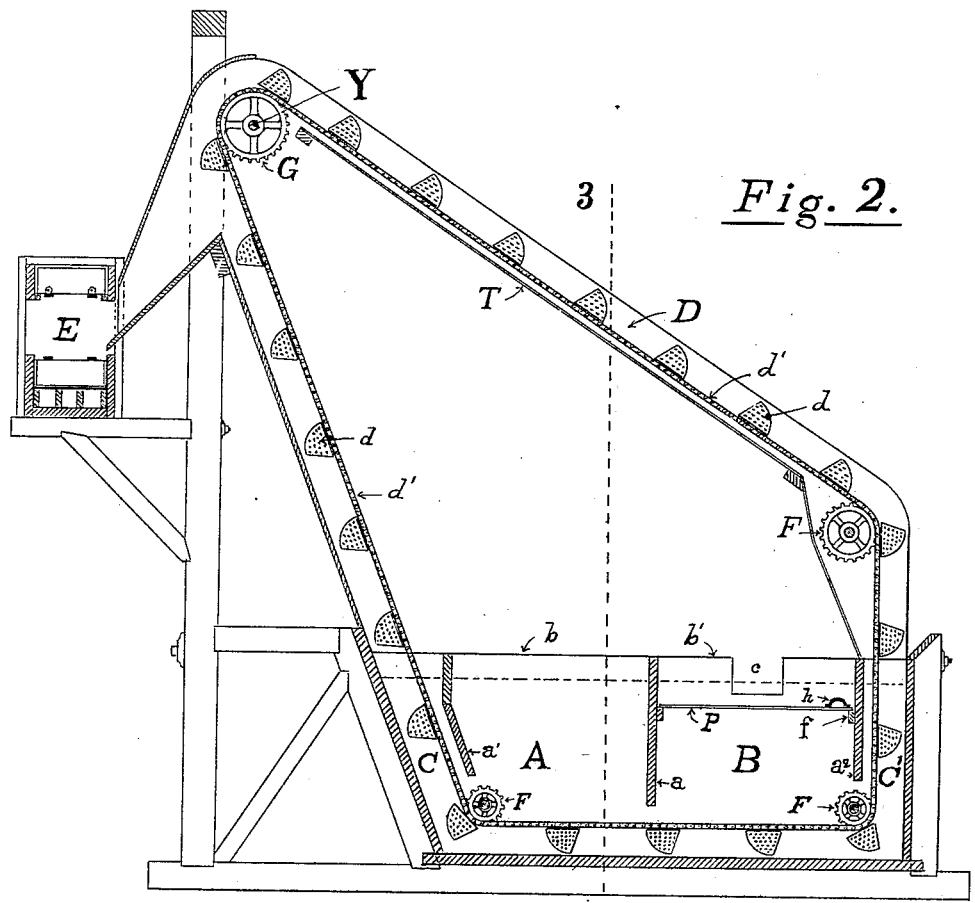
Figure 3:
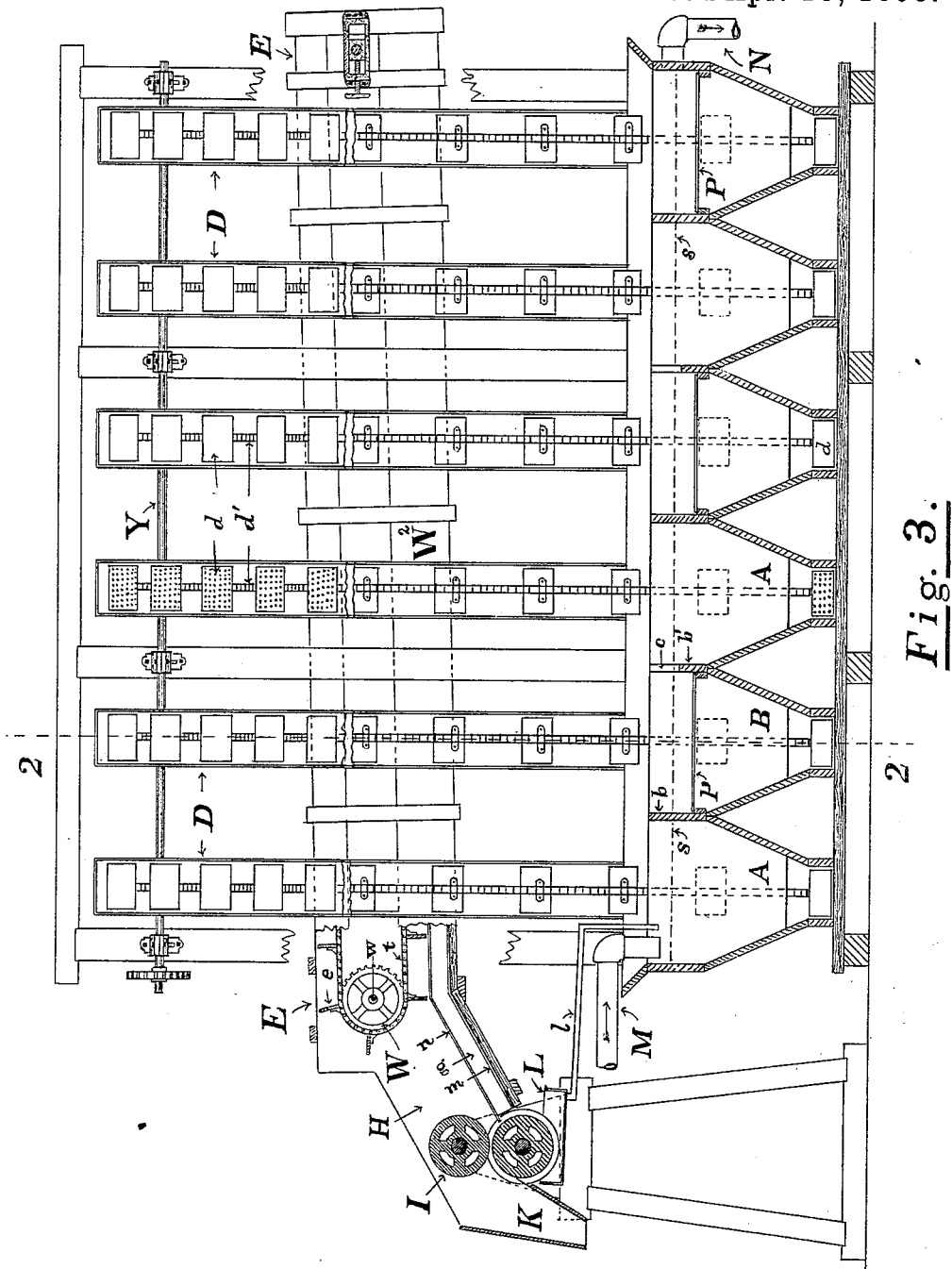
Figure 4:
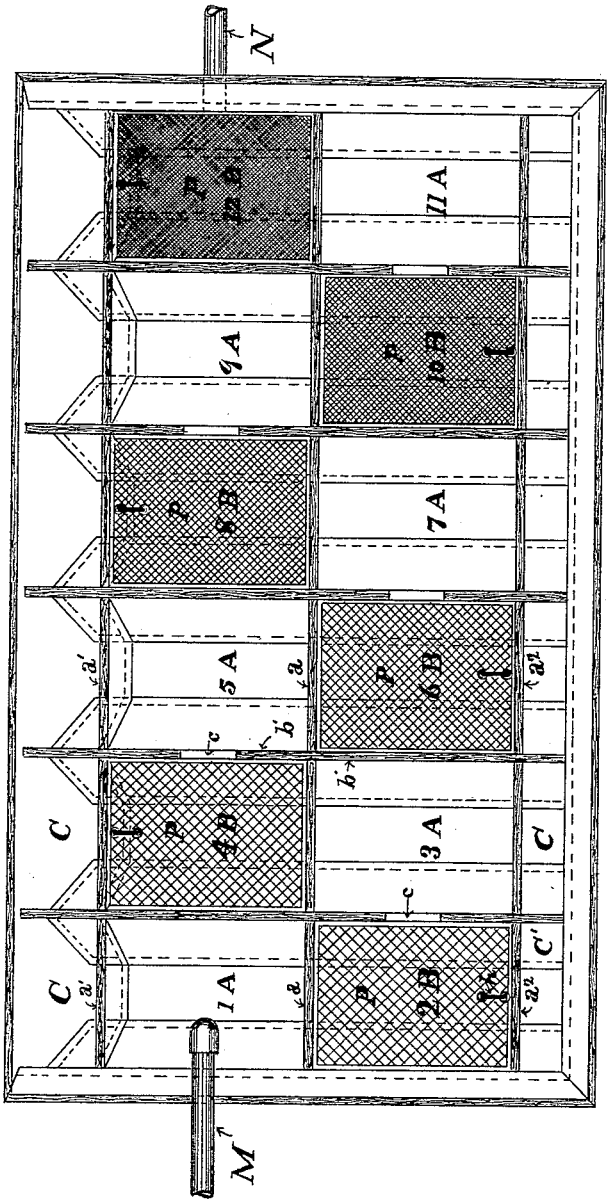
Figure 6:
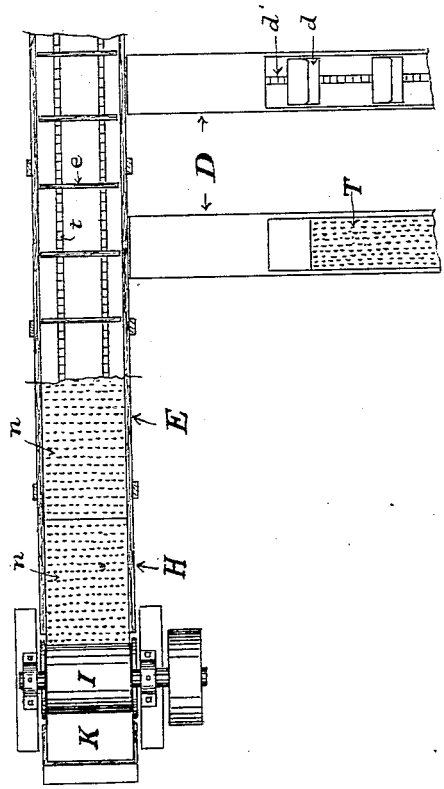

In the accompanying drawings, Figure 1 is a top plan of one form of an apparatus embodying our invention. Fig. 2 is a vertical section of the same, taken on line 2 2 in Fig. 3. Fig. 3 is a vertical section taken on line 3 3 in Fig. 2. Fig. 4 is a top plan of the apparatus, having the upper portion of the traveling conveyers removed, so as to illustrate the arrangement of vats. Fig. 5 is a detail view of one form of conveyer. Fig. 6 is a top plan of the pressing means and a portion of the conveyer and the straining-chute leading thereto, illustrating the perforated bottoms of the latter.

We have illustrated in the drawings the preferred embodiment of our invention—namely, a series of vats, tanks, or compartments the bottoms of which serve as the settling-partitions. We do not intend, however, to limit the scope of the invention to such arrangement, for it is obvious that we may, for the broader purposes of the invention, supply a containing vessel with settling-partitions in other ways.

The vats illustrated could be of any suitable size, form, or construction, and could be arranged in any one of a number of ways. We have shown, however, an arrangement which we prefer for obvious reasons; but we do not, when we use vats or the like, confine ourselves to such arrangement, since we may vary the same, if desired. In this arrangement a couple of vats, as 1$^A$ and 2$^B$, are placed side by side, and the pair thus formed is duplicated as many times as the quality of the mixture under treatment renders necessary. Thus in Fig. 4 six pairs have been shown, though this number is of course selected merely for the purpose of illustration. These vats are so connected that the mixture flows from one to another, the direction of flow being upward in the straining-vats and in such a direction in the other as to permit this upward flow in the straining-vats. For instance, assuming that the mixture flows through the pipe M into the vat 1$^A$, it will flow downward in this vat, thence to the vat 2$^B$, upward in this vat, thence into and downward in vat 3$^A$, and so on through the entire series of vats until the practically clear liquid emerges through the outlet-pipe N. The vats are sufficiently large and the quantity of mixture fed to them sufficiently small to insure a slow and steady flow in the vats and thereby permit the particles of solid or consistent matter to settle. The alternate vats of the series in which the mixture flows upward are provided with strainers and are termed "straining-vats." In the arrangement shown the straining-vats are 2$^B$ 4$^B$ 6$^B$, &c.

As a simple and convenient arrangement for permitting the flow of mixture from vat to vat the partitions $a$ of the vats do not extend to the bottoms of the same, but allow sufficient space for the passage of the mixture from the settling-vats A to the straining-vats B, as shown in Fig. 2, and the dividing-walls $b'$ are provided with openings or notches $c$ at their upper edges, through which the mixture may flow from the straining-vats B to the settling-vats A.

The strainers P in the straining-vats may be of any suitable material and may be supported at a convenient distance above the bottoms of the vats in any desired manner. We prefer, however, that the strainers be composed of perforated metal, wire screening, or the like, and that such strainers be supported upon shoulders or ledges $f$, extending along the sides of the vats, as in Fig. 2. The strainers P are also desirably provided with handles $h$, whereby they may be raised or removed, if necessary, without interrupting the continuity of the process. In such case no loss will occur, for the succeeding strainer will arrest the particles that would otherwise have been arrested by the one removed.

The strainer in the vat 2$^B$ is the coarsest of the series, and each succeeding one is finer than its predecessor. A portion of the solid or consistent matter settles to the bottom of each vat, the larger particles in the first vats in the series and the smaller particles in the last vats. As a means for removing such sediment or deposit from the bottoms of the vats we have shown a number of conveyers D, each of which is arranged to traverse the bottom of a pair of vats to collect the sediment deposited there, to elevate the same, and to deliver it at a predetermined point. These conveyers D may be of any suitable construction and arrangement, but are preferably of the "bucket" type, and consist of the endless belts or chains $d'$ and a number of buckets or scoops $d$ attached to such belts or chains. The buckets are arranged so that their edge portions move across the bottoms of the vats, as shown in Fig. 2, the belts or chains $d'$ being guided in such case by the sprocket-pulleys F and passing over the pulleys G on the driving-shaft Y.

As a matter of further and specific improvement in the vats for the accommodation of this arrangement of conveyer or elevator compartments C and C' are provided at the ends of each pair of vats. The partitions $a'$ and $a^2$ between the vats and these compartments C and C' are not extended to the bottom of the same, but permit the conveyers to pass between their lower edges and the bottom of the vats. The conveyers, then, may travel the entire width of each pair of vats and may rise and descend in the compartments C and C' without agitating the mixture in the vats. The sides of the vats running parallel to the direction of travel of the conveyers are desirably inclined inwardly from the vertical, thereby forming a trough at the bottom of each pair of vats, which obviates the necessity of employing broad and clumsy buckets for the conveyers D. The buckets $d$ are desirably perforated, and thereby permit some of the liquid which is raised by them with the solid matter to drain off. Below the paths of travel of the conveyers D are troughs T, which catch the drain from the buckets $d$ and allow it to return to the vats. The conveyers D are arranged to empty their contents into a main conveyer E, which latter is supported along the length of the series of vats below the upper ends of the conveyers D and is arranged to carry the matter deposited upon it to the pressing apparatus.

Of the many constructions which would be available for the conveyer E we have selected an underrunning paddle conveyer, which is arranged to scrape the solid material along the bottom of a containing conveyer-box. This conveyer is composed of one or more endless chains $t$, which pass around sprocket-wheels W and W', situated at each end of the conveyer-box W$^2$. The wheel W is supported upon a driving-shaft $w$, and W' is mounted so as to be capable of adjustment along the length of the conveyer-box W$^2$, as shown in Fig. 3. Attached at intervals to the chain or chains $t$ are the paddles or scrapers $e$. The bottom of the conveyer-box W$^2$ is preferably constructed with a lining of metal or other waterproof material $m$ and a grating $g$, which latter is covered with a layer of perforated metal $n$, as shown in Figs. 5 and 6. By such arrangement considerable liquid flows from the solid material to the bottom of the conveyer-box.

The pressing apparatus I, which is situated to receive the product from the conveyer E, may be of any suitable type—such as screw, power, or hydraulic presses—but we prefer to employ one or more roller presses, since the latter may be operated continuously, and do not therefore require the time and labor in their operation that is involved in filling and discharging the former.

As a convenient arrangement for handling the product after it leaves the conveyer E we have shown a chute H, connecting the end of the conveyer E and the press or presses I, a spout K, leading from the press, and a pan L, situated below the press or presses and connected with the pipe $l$, which latter terminates in the vat $1^A$. The bottom of the chute H is desirably perforated, as shown in Fig. 6, whereby more of the moisture is drained off in traversing it. The conveyer E discharges the solid product into the chute H, and the latter conducts it to the press or presses I, which force out a still further amount of moisture and discharge it through the spout K. This solid product is then ready to be dried. The liquid drained from the conveyer E, the chute H, and the pressing apparatus I is received by the pan L, and as it contains a small amount of solid matter is returned to the vat A through the pipe $l$.

Obviously by our invention solids may be economically and efficiently separated from their containing liquids. Either the solid or the liquid product, or both, may be separately recovered. By directing the flow of mixture upward through strainers the advantage involved in the use of strainers may be procured without any of the disadvantages, such as clogging, breaking, and the like. The entire process may proceed without interruption. Where distillers' slops and the like are treated, the solid matter forming the product may be automatically carried to a pressing apparatus, and finally during such removal this solid product may be drained of a considerable amount of moisture.

What we claim as our invention is—

1. An apparatus of the class specified comprising a vessel adapted to hold the mixture, said vessel having an inlet and an outlet, and being provided with a number of settling-partitions, and also with a number of strainers, whereof each strainer is situated above a settling-partition, and the inlet and outlet being arranged to direct the flow of mixture upward through the strainers; and power-driven conveying mechanism arranged to collect the sediment deposited upon the partitions, and to remove the same from the vessel, as set forth.

2. An apparatus of the class specified comprising a vessel adapted to hold the mixture, said vessel having an inlet and an outlet, and being provided with a number of settling-partitions, and a number of strainers less than the number of settling-partitions, whereof each strainer is situated above a settling-partition, and the inlet and outlet being arranged to direct the flow of mixture upward through the strainers; and power-driven conveying mechanism arranged to collect the sediment deposited upon the partitions, and to remove the same from the vessel, as set forth.

3. An apparatus of the class specified comprising a vessel adapted to hold the mixture, said vessel having an inlet and an outlet, and being provided with a number of settling-partitions, and also with a number of strainers, whereof each strainer is situated above a settling-partition, and the inlet and outlet being arranged to direct the flow of mixture upward through the strainers, conveying mechanism arranged to collect the sediment deposited upon the partitions, and to remove the same from the vessel; and pressing means situated and connected to receive the sediment from the conveying mechanism, as set forth.

4. An apparatus of the class specified comprising a vessel adapted to hold the mixture, said vessel having an inlet and an outlet, and being provided with a number of settling-partitions, and also with a number of strainers less than the number of settling-partitions, whereof each strainer is situated above a settling-partition, and the inlet and outlet being arranged to direct the flow of mixture upward through the strainers; conveying mechanism arranged to collect the sediment deposited upon the partitions, and to remove the same from the vessel; and pressing means situated and connected to receive the sediment from the conveying mechanism, as set forth.

5. An apparatus of the class specified comprising a series of vats or tanks having an inlet and an outlet, and being arranged and connected to permit the flow of mixture through the entire series, a portion of the vats or tanks being provided with strainers and connected to direct the flow of mixture upward through such strainers; and power-driven conveying mechanism arranged to collect the sediment deposited in the vats or tanks, and remove the same, substantially as set forth.

6. An apparatus of the class specified comprising a series of vats or tanks having an inlet and an outlet, and being arranged and connected to permit the flow of mixture through the entire series; power-driven conveying mechanism arranged to collect the sediment deposited in the vats or tanks, and to remove the same; and pressing means situated and connected to receive the sediment from the conveying mechanism, as set forth.

7. An apparatus of the class specified comprising a series of vats or tanks having an inlet and an outlet, and being arranged and connected to permit the flow of mixture through the entire series, a portion of the vats or tanks being provided with strainers, and connected to direct the flow of mixture upward through the strainers; conveying mechanism arranged to collect the sediment deposited in the vats or tanks, and to remove the same; and pressing means situated and connected to receive the sediment from the conveying mechanism, as set forth.

8. An apparatus of the class specified comprising a series of vats or tanks having an inlet and an outlet, and being arranged in a plurality of rows and connected to permit the flow of mixture through the entire series; a number of conveyers, each of which is arranged to collect the sediment deposited in the vats or tanks composing a row, and to remove the same; a main conveyer arranged to receive the sediment from the first-mentioned conveyers; and pressing means situated and connected to receive the sediment from the main conveyer, substantially as set forth.

9. An apparatus of the class specified comprising a series of vats or tanks having an inlet and an outlet, and being arranged in a plurality of rows and connected to permit the flow of mixture through the entire series, a portion of said vats or tanks being provided with strainers and being connected to direct the flow of mixture upward through such strainers; a number of traveling conveyers, each of which is arranged to collect the sediment deposited in the vats or tanks composing a row, and to remove the same; a main conveyer arranged to receive the sediment from the first-mentioned conveyers; and pressing means situated and connected to take the sediment from the main conveyer, substantially as described.

10. A separating apparatus comprising a series of vats arranged in pairs, whereof one vat in each pair contains a strainer, said vats being provided with inwardly-inclined sides forming a trough extending the length of each pair, and being arranged and connected to permit the flow of mixture through the entire series and to direct such flow upward in the vats containing strainers and downward in the vats not so provided; a number of bucket conveyers, each of which is arranged to move in the trough formed at the bottom of each pair of vats, and to collect and remove the solid matter deposited there; a second or main conveyer situated to receive the contents of the bucket conveyer; and one or more roller-presses arranged to receive the solid matter from the main conveyer, substantially as described.

11. In an apparatus of the class specified, the combination with the settling vessel, of the pressing apparatus; a power-driven traveling conveyer leading thereto; a straining-chute connecting the pressing apparatus with the conveyer; and a pan or trough situated below the pressing apparatus, the connecting-chute, and the end of the conveyer, and connected with the vessel, as set forth.

12. In an apparatus of the class specified, a number of vats arranged end to end; a couple of compartments one exterior to each end of the series of vats, the abutting walls of the vats and compartments being extended only part way to the bottom of the same; and a traveling conveyer arranged to traverse said vats below the edges of the dividing-walls, and to rise and descend in said exterior compartments, as set forth.

13. In an apparatus of the class specified, the combination with a series of vats, of a traveling conveyer or conveyers having straining means for holding the material collected; and a trough or troughs supported below the conveyer or conveyers and connected at their lower ends with the vats, whereby the drain may return to the latter, as set forth.

14. An apparatus for separating the solid or consistent matters from "distillers' slops" and the like, the same comprising strainers arranged for successively straining the slops and permitting the intercepted solid or consistent matters to gravitate from the same to suitable repositories; means for inducing a flow of the slops through the strainers; and power-driven means for collecting the solid or consistent matters intercepted by the strainers and gravitating therefrom.

15. An apparatus for separating the solid or consistent matters from "distillers' slops" or the like, the same comprising strainers for successively straining the slops; means for inducing a flow of the slops upwardly through the strainers; and power-driven means for collecting the solid or consistent matters intercepted by the strainers and gravitating reversely to the direction of flow of the slops.

AUGUSTUS F. McCLATCHEY.
CHARLES L. KRUM.

Witnesses:
RETA M. WAGNER,
A. MILLER BELFIELD.